(12) United States Patent
Curtis

(10) Patent No.: US 10,437,630 B2
(45) Date of Patent: Oct. 8, 2019

(54) SYSTEM FOR TRANSFORMING LARGE SCALE ELECTRONIC PROCESSING USING APPLICATION BLOCK CHAIN AND MULTI-STRUCTURED DATA STORES

(71) Applicant: Bank of America Corporation, Charlotte, NC (US)

(72) Inventor: Donald Steve Curtis, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 395 days.

(21) Appl. No.: 15/252,744

(22) Filed: Aug. 31, 2016

(65) Prior Publication Data

US 2017/0293503 A1 Oct. 12, 2017

Related U.S. Application Data

(60) Provisional application No. 62/320,556, filed on Apr. 10, 2016.

(51) Int. Cl.
G06Q 40/00 (2012.01)
G06F 9/46 (2006.01)
(Continued)

(52) U.S. Cl.
CPC .............. *G06F 9/466* (2013.01); *G06F 16/27* (2019.01); *H04L 67/025* (2013.01); *H04L 67/06* (2013.01); *H04L 67/1095* (2013.01)

(58) Field of Classification Search
CPC ....................................................... G06Q 40/00
(Continued)

(56) References Cited

U.S. PATENT DOCUMENTS 5,671,283 A 9/1997 Michener et al.
5,835,599 A 11/1998 Buer
(Continued)

FOREIGN PATENT DOCUMENTS

WO    2005081917 A2    9/2005

OTHER PUBLICATIONS

Swanson, T. (2015). "Explore the Blockchain, Ignore the Bitcoin Maximalists." American Banker, 1(170). Retrieved from https://dialog.proquest.com/professional/docview/1737914658?accountid=142257.*
Bradley Hope et al., "A Bitcoin Technology Gets Nasdaq Test"; May 10, 2015; retrieved from http://www.wsj.com/articles/a-bitcoin-technology-gets-nasdaq-test-1431296886.
(Continued)

*Primary Examiner* — Ojo O Oyebisi
(74) *Attorney, Agent, or Firm* — Michael A. Springs; Moore & Van Allen PLLC; Peter B. Stewart

(57) ABSTRACT

Embodiments of the invention are directed to systems, methods, and computer program products for processing of electronic files using multiple technology applications in a distributed network. Specifically, the present invention is directed to establishing technology applications and/or platforms as participants on block chain framework for direct and real-time visibility into discreet processing events associated with the processing of the electronic files. In some embodiments, the invention enables tracking and monitoring of end-to-end processing status during processing of the electronic files in real-time, without requiring transmission of electronic file data between applications, while allowing for compatibility of data in multiple formats, and hence executing end-to-end processing of electronic files.

20 Claims, 6 Drawing Sheets

(51) Int. Cl.
*H04L 29/08* (2006.01)
*G06F 16/27* (2019.01)

(58) Field of Classification Search
USPC .......................................................... 705/44
See application file for complete search history.

(56) References Cited

U.S. PATENT DOCUMENTS

| | | | |
|---|---|---|---|
| 6,148,338 | A | 11/2000 | Lachelt et al. |
| 6,324,286 | B1 | 11/2001 | Lai et al. |
| 6,658,393 | B1 | 12/2003 | Basch et al. |
| 6,973,187 | B2 | 12/2005 | Gligor et al. |
| 7,055,039 | B2 | 5/2006 | Chavanne et al. |
| 7,092,400 | B2 | 8/2006 | Malzahn |
| 7,184,549 | B2 | 2/2007 | Sorimachi et al. |
| 7,362,859 | B1 | 4/2008 | Robertson et al. |
| 7,392,384 | B2 | 6/2008 | Hopkins et al. |
| 7,428,306 | B2 | 9/2008 | Celikkan et al. |
| 7,649,992 | B2 | 1/2010 | Raju et al. |
| 7,764,788 | B2 | 7/2010 | Tardo |
| 7,904,321 | B2 | 3/2011 | Moore et al. |
| 8,078,874 | B2 | 12/2011 | You et al. |
| 8,107,621 | B2 | 1/2012 | Celikkan et al. |
| 8,155,311 | B2 | 4/2012 | Shin et al. |
| 8,156,040 | B2 | 4/2012 | Gavin et al. |
| 8,259,934 | B2 | 9/2012 | Karroumi et al. |
| 8,296,232 | B2 | 10/2012 | Tullis et al. |
| 8,358,781 | B2 | 1/2013 | Schneider |
| 8,396,209 | B2 | 3/2013 | Schneider |
| 8,397,841 | B1 | 3/2013 | Taylor et al. |
| 8,412,605 | B2 | 4/2013 | Griffin et al. |
| 8,416,947 | B2 | 4/2013 | Schneider |
| 8,458,461 | B2 | 6/2013 | Tardo |
| 8,532,136 | B1 | 9/2013 | Samuel |
| 8,590,055 | B2 | 11/2013 | Yoon et al. |
| 8,606,705 | B2 | 12/2013 | Zanzot et al. |
| 8,606,706 | B2 | 12/2013 | Zanzot et al. |
| 8,737,606 | B2 | 5/2014 | Taylor et al. |
| 8,942,374 | B2 | 1/2015 | Fujisaki |
| 8,983,063 | B1 | 3/2015 | Taylor et al. |
| 9,059,866 | B2 | 6/2015 | Bar-Sade et al. |
| 2002/0023053 | A1 | 2/2002 | Szoc et al. |
| 2003/0120586 | A1 | 6/2003 | Litty |
| 2003/0140007 | A1 | 7/2003 | Kramer et al. |
| 2003/0208440 | A1 | 11/2003 | Harada et al. |
| 2004/0153650 | A1 | 8/2004 | Hillmer |
| 2004/0153663 | A1 | 8/2004 | Clark et al. |
| 2004/0215560 | A1 | 10/2004 | Amalraj et al. |
| 2004/0245330 | A1 | 12/2004 | Swift et al. |
| 2005/0010524 | A1 | 1/2005 | Gutbrod et al. |
| 2005/0080701 | A1 | 4/2005 | Tunney et al. |
| 2006/0089905 | A1 | 4/2006 | Song et al. |
| 2006/0095364 | A1 | 5/2006 | Hamilton et al. |
| 2006/0116898 | A1 | 6/2006 | Peterson |
| 2006/0282660 | A1 | 12/2006 | Varghese et al. |
| 2007/0061260 | A1 | 3/2007 | deGroeve et al. |
| 2007/0162387 | A1 | 7/2007 | Cataline et al. |
| 2007/0174214 | A1 | 7/2007 | Welsh et al. |
| 2007/0198437 | A1 | 8/2007 | Eisner et al. |
| 2008/0015985 | A1 | 1/2008 | Abhari et al. |
| 2008/0077474 | A1 | 3/2008 | Dumas et al. |
| 2008/0103800 | A1 | 5/2008 | Domenikos et al. |
| 2008/0103972 | A1 | 5/2008 | Lanc |
| 2008/0140576 | A1 | 6/2008 | Lewis et al. |
| 2008/0195537 | A1 | 8/2008 | Schulz |
| 2008/0290181 | A1 | 11/2008 | Dimitri et al. |
| 2008/0294541 | A1 | 11/2008 | Weinflash et al. |
| 2008/0319922 | A1 | 12/2008 | Lawrence et al. |
| 2009/0106846 | A1 | 4/2009 | Dupray et al. |
| 2009/0248560 | A1 | 10/2009 | Recce et al. |
| 2009/0248573 | A1 | 10/2009 | Haggerty et al. |
| 2010/0241493 | A1 | 9/2010 | Onischuk |
| 2011/0066547 | A1 | 3/2011 | Clark et al. |
| 2013/0073473 | A1 | 3/2013 | Heath |
| 2014/0181123 | A1 | 6/2014 | Tuffet Blaise et al. |
| 2015/0172053 | A1 | 6/2015 | Schwarz et al. |
| 2015/0200940 | A1 | 7/2015 | Pace |
| 2015/0206106 | A1 | 7/2015 | Yago |
| 2016/0012465 | A1 | 1/2016 | Sharp |
| 2016/0036840 | A1 | 2/2016 | Dogu et al. |
| 2016/0253089 | A1 | 9/2016 | Lee et al. |
| 2016/0260171 | A1* | 9/2016 | Ford ...................... G06Q 40/04 |
| 2017/0147722 | A1 | 5/2017 | Greenwood |
| 2017/0295232 | A1 | 10/2017 | Curtis |
| 2017/0315697 | A1 | 11/2017 | Jacobson et al. |

OTHER PUBLICATIONS

Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.

Joseph C. Guagliardo et al., "Blockchain: Preparing for Disruption Like It's the 90s"; Mar. 14, 2016, retrieved from http://www.law360.com/artides/77120CVprint?section=ip.

Robert McMillian, "IBM Bets on Bitcoin Ledger"; Feb. 16, 2016, retrieved from http://www.wsj.com/articles/ibm-bets-on-bitcoin-ledger-1455598864.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0Cf267bdb90a0ee6.pdf.

European Patent Office Action for European Application No. 10 250 245.7-1955 dated May 6, 2013.

European Search Report for European Application No. EP 10 25 0246 dated May 27, 2010.

Extended European Search Report for European Application No. EP 10 25 0245 dated Jun. 1, 2010.

International Preliminary Report on Patentability and Written Opinion for PCT International Application No. PCT/US2010/058403 dated Jun. 5, 2012.

International Preliminary Report on Patentability and Written Opinion for PCT International Application No. PCT/US2010/058409 dated Jun. 5, 2012.

International Preliminary Report on Patentability and Written Opinion for PCT International Application No. PCT/US2010/058414 dated Jun. 5, 2012.

International Preliminary Report on Patentability dated Aug. 25, 2011 for PCT/US2010/024113.

International Preliminary Report on Patentability dated Aug. 25, 2011 for PCT/US2010/024123.

International Search Report and the Written Opinion of the International Searching Authority for International Application No. PCT/US2010/024123 dated Apr. 2, 2010.

International Search Report and the Written Opinion of the International Searching Authority for International Application No. PCT/US2010/024113 dated Apr. 12, 2010.

International Search Report and the Written Opinion of the International Searching Authority for International Application No. PCT/US2010/058380 dated Jan. 24, 2011.

International Search Report and the Written Opinion of the International Searching Authority for International Application No. PCT/US2010/058403 dated Jan. 24, 2011.

International Search Report and the Written Opinion of the International Searching Authority for International Application No. PCT/US2010/058414 dated Jan. 24, 2011.

International Search Report and the Written Opinion of the International Searching Authority for International Application No. PCT/US2010/058409 dated Jan. 31, 2011.

Mexican Office Action for Mexico Application No. MX/a/2010/001718 dated May 29, 2012.

Related U.S. Appl. No. 15/252,761, filed Aug. 31, 2016.
Related U.S. Appl. No. 15/288,779, filed Oct. 7, 2016.
Related U.S. Appl. No. 15/288,818, filed Oct. 7, 2016.
Related U.S. Appl. No. 15/288,835, filed Oct. 7, 2016.

* cited by examiner

SYSTEM FOR TRANSFORMING LARGE SCALE ELECTRONIC PROCESSING USING APPLICATION BLOCK CHAIN AND MULTI-STRUCTURED DATA STORES

CROSS-REFERENCE TO PRIORITY APPLICATION

This application claims the benefit of U.S. Provisional Patent Application Ser. No. 62/320,556, filed on Apr. 10, 2016, entitled "System Transformation of Technical Requests and Transactional Processing in a Global Environment," which is hereby incorporated by reference in its entirety.

BACKGROUND

Existing systems for high volume data processing require multiple channels and multiple applications running in order to complete the processing stages of electronic data. However, these systems require middleware for transferring and holding data between application processes, and therefore these systems have high memory, processing resource, and time requirements. Furthermore, due to the intricacies of data staging and complex application processing, tracking the processing stages of electronic data as the data are being processed by numerous applications and determining the status and content of the data is not feasible. Therefore, a need exists for novel network architectures that enable real-time determination and tracking of processing events associated with electronic data, while reducing the time, memory and processing requirements.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for operatively connecting with a block chain distributed network and using the block chain distributed network for housing technology applications for facilitating the processing of data without middleware and/or transferring of data across various applications for each stage of electronic file processing.

In some embodiments, the invention establishes application systems (for example, legacy applications) as participants on a block chain fabric for direct and immediate visibility into discreet processing events for the tracking and monitoring of end-to-end transactional status. The request and processing of an end-to-end transaction frequently requires the invocation of a large number of discreet technology applications or software components. These technology applications typically reside on disparate and unconnected processing platforms that are frequently distributed globally. The disparate and distributed nature of the software components that collectively comprise an end-to-end processing of an electronic file or execution of the associated activity can make the simultaneous tracking and monitoring of large numbers of activities virtually impossible. This invention provides unique steps that are required to transform the block chain from a distributed ledger of individuals into a distributed ledger of applications. The invention articulates the steps required to place a series of processing applications onto the block chain as participants within an internal distributed ledger. The placement of applications as participants allows for those applications to dynamically receive immediate updates to each processing event and thereby enables real-time tracking, monitoring and reporting of the status of each individual activity as the processing events occur.

Embodiments of the invention relate to systems, methods, and computer program products for processing electronic files using a plurality of technology applications, via a block chain distributed network. Typically the system comprises: a distributed block chain network comprising a plurality of technology applications as participants; at least one memory device with computer-readable program code stored thereon; at least one communication device; at least one processing device operatively coupled to the at least one memory device and the at least one communication device, wherein executing the computer-readable code is configured to cause the at least one processing device to: establish an integrated ledger for the distributed block chain network comprising the plurality of technology applications as participants; receive a request to process at least one electronic file, wherein the at least one electronic file comprises one or more activity records; process the at least one electronic file using the plurality of technology applications, wherein processing, for each activity record of the one or more records, comprises: constructing a block chain ledger at a first data location of the integrated ledger; initiating a first processing event comprising processing the activity record using a first technology application of the plurality of technology applications; and creating a first block on the block chain ledger associated with the first processing event; wherein creating the first block associated with the first processing event is configured to trigger, automatically, a second processing event comprising processing the activity record by a second technology application of the plurality of technology applications.

In some embodiments, or in combination with any of the previous embodiments, the distributed block chain network further comprises: the plurality of technology applications, wherein each of the plurality of technology applications is a participant node of the distributed block chain network; and a ledger gateway system, wherein the ledger gateway system is configured for establishing communication between the plurality of technology applications and the integrated ledger; wherein, the ledger gateway system comprises protocol converters configured for communicating using two or more protocols.

In some embodiments, or in combination with any of the previous embodiments, the distributed block chain network further comprises a multi-structure data store configured for storing the activity record and processing data associated with the first processing event.

In some embodiments, or in combination with any of the previous embodiments, constructing, for each activity record, the block chain ledger at the first data location of the integrated ledger further comprises: assigning a unique identifier for the activity record; determining a primary processing platform for the activity record; determining the first technology application associated with the primary processing platform; and transmitting control instructions to the first technology application to initiate the first processing event.

In some embodiments, or in combination with any of the previous embodiments, creating the first block on the block chain ledger associated with the first processing event further comprises: transforming, via a ledger gateway system, transaction data associated with the first processing event into a predetermined format compatible with the integrated ledger; logging, via the ledger gateway system, the transaction data associated with the first processing event at a second data location; transmitting, via the ledger gateway system, the second data location to a transaction processing application associated with the integrated ledger; adding, via the transaction processing application, the first block comprising the transaction data to the block chain ledger; and validating, via at least one of the plurality of technology applications, the first block.

In some embodiments, or in combination with any of the previous embodiments, executing the computer-readable code is configured to further cause the at least one processing device to: receive a request to determine the processing event status of a first activity record of the one or more activity records; determine, a unique identifier for the first activity record; access, via the integrated ledger, a first block chain associated with the unique identifier; identify a current block of the first block chain; determine a current processing event associated with the current block of the first block chain, wherein determining the current processing event comprises determining a technology application associated with the current block; and initiate a presentation of the current processing event on a display associated with a user system.

In some embodiments, or in combination with any of the previous embodiments, creating a first block on the block chain ledger associated with the first processing event further comprises: publishing, via the block chain ledger, the first block to the plurality of technology applications, wherein the first block is available to each of the plurality of technology applications, in real-time; wherein publishing the first block to the plurality of technology applications, in real-time, is configured to trigger, automatically, the second processing event.

In some embodiments, or in combination with any of the previous embodiments, processing the activity record further comprises: determining the second processing event comprising processing the activity record using the second technology application, wherein the second processing event is triggered, automatically, based on creating the first block on the block chain ledger; and creating a second block on the block chain ledger associated with the second processing event; wherein creating the second block associated with the second processing event is configured to trigger, automatically, a third processing event comprising processing the activity record by a third technology application of the plurality of technology applications.

In some embodiments, the invention comprises establishing a multi-structure data store for storage; establishing a private distributed ledger with registration of applications as participants on the private distributed ledger; and tracking and monitoring processing events on the block chain distributed network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
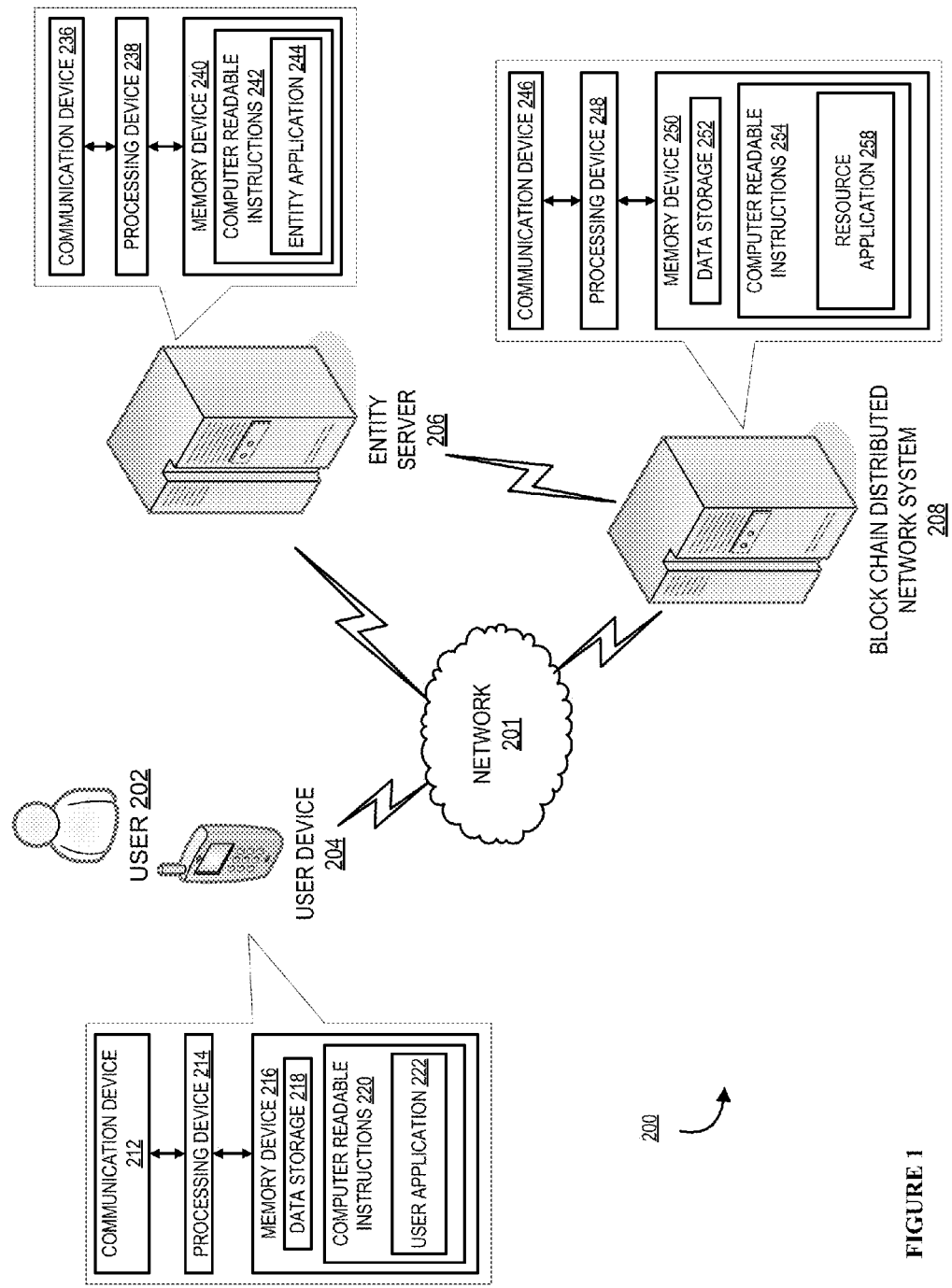
Figure 2A:
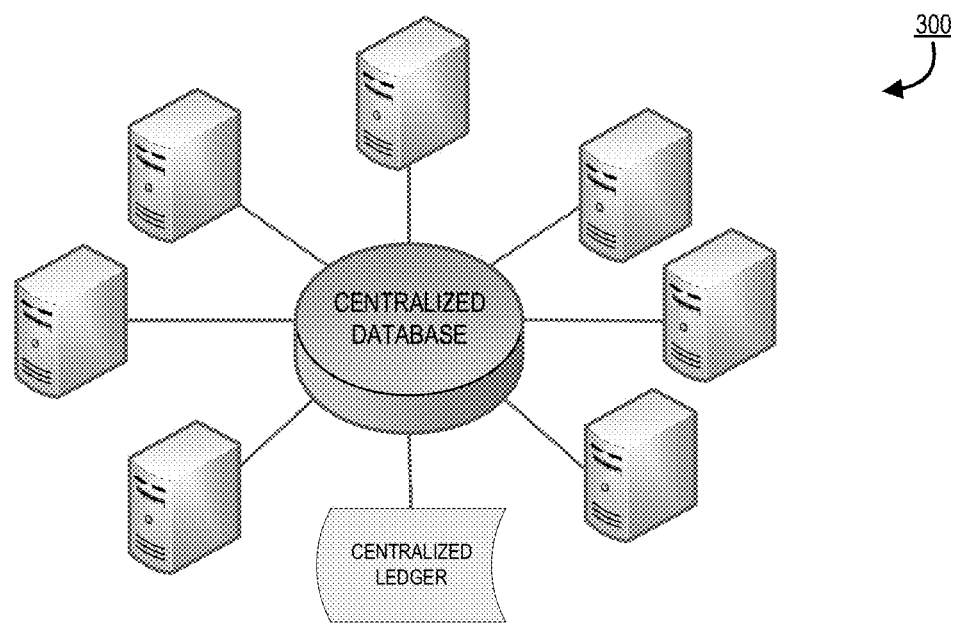
Figure 2B:
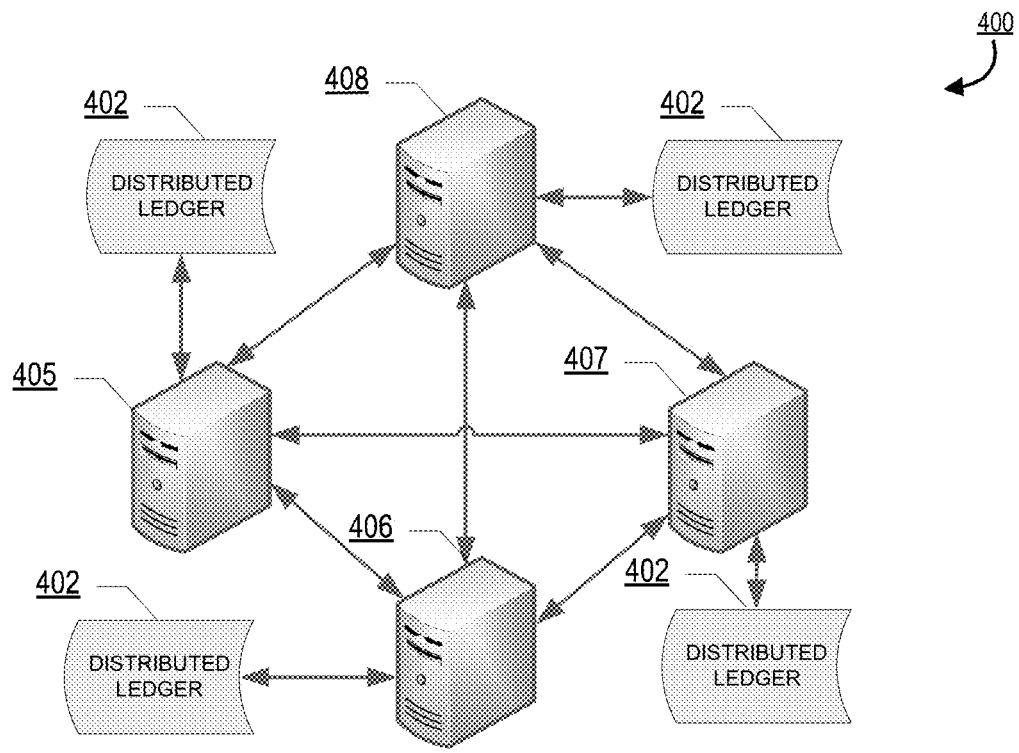
Figure 3:
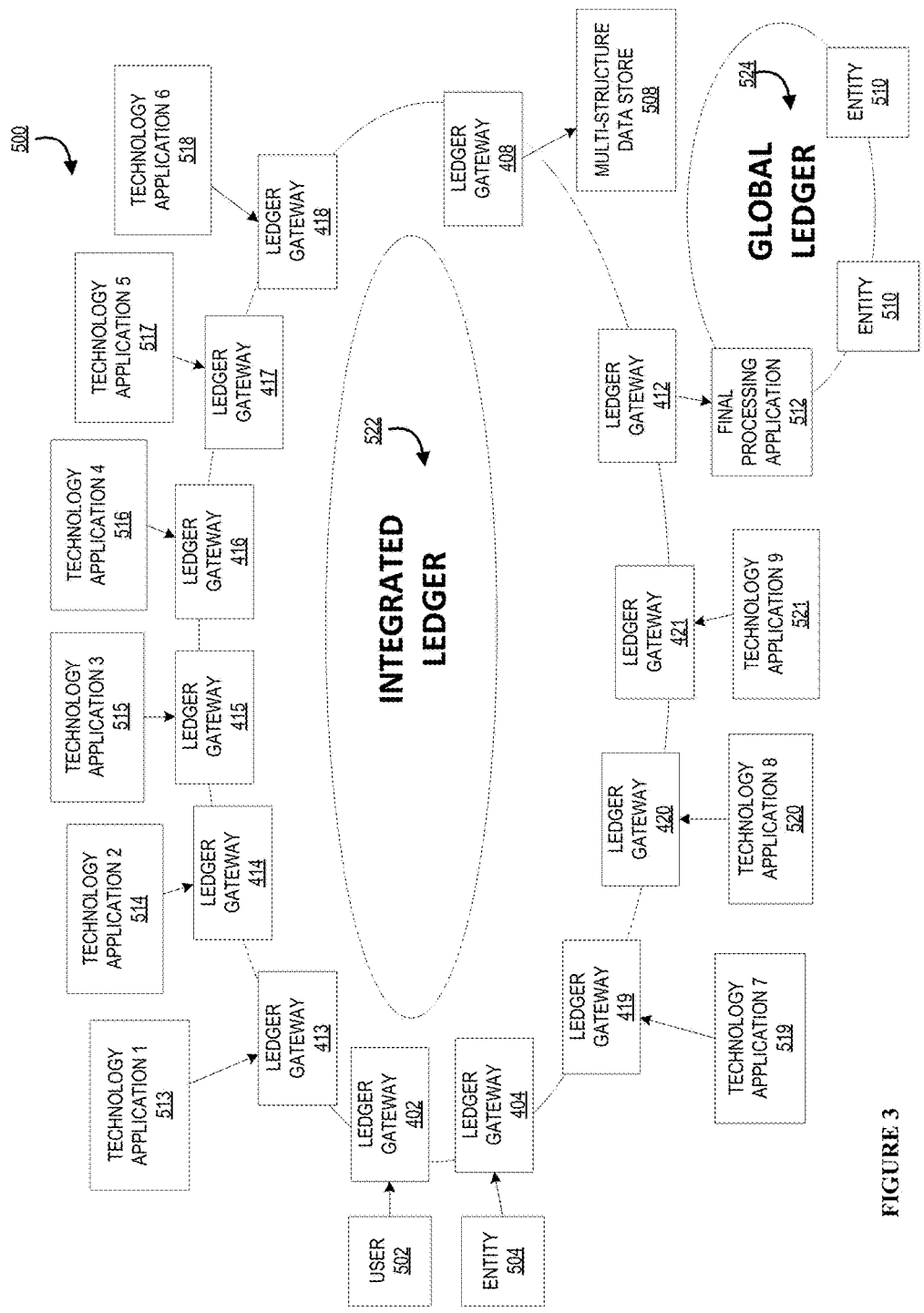
Figure 4:
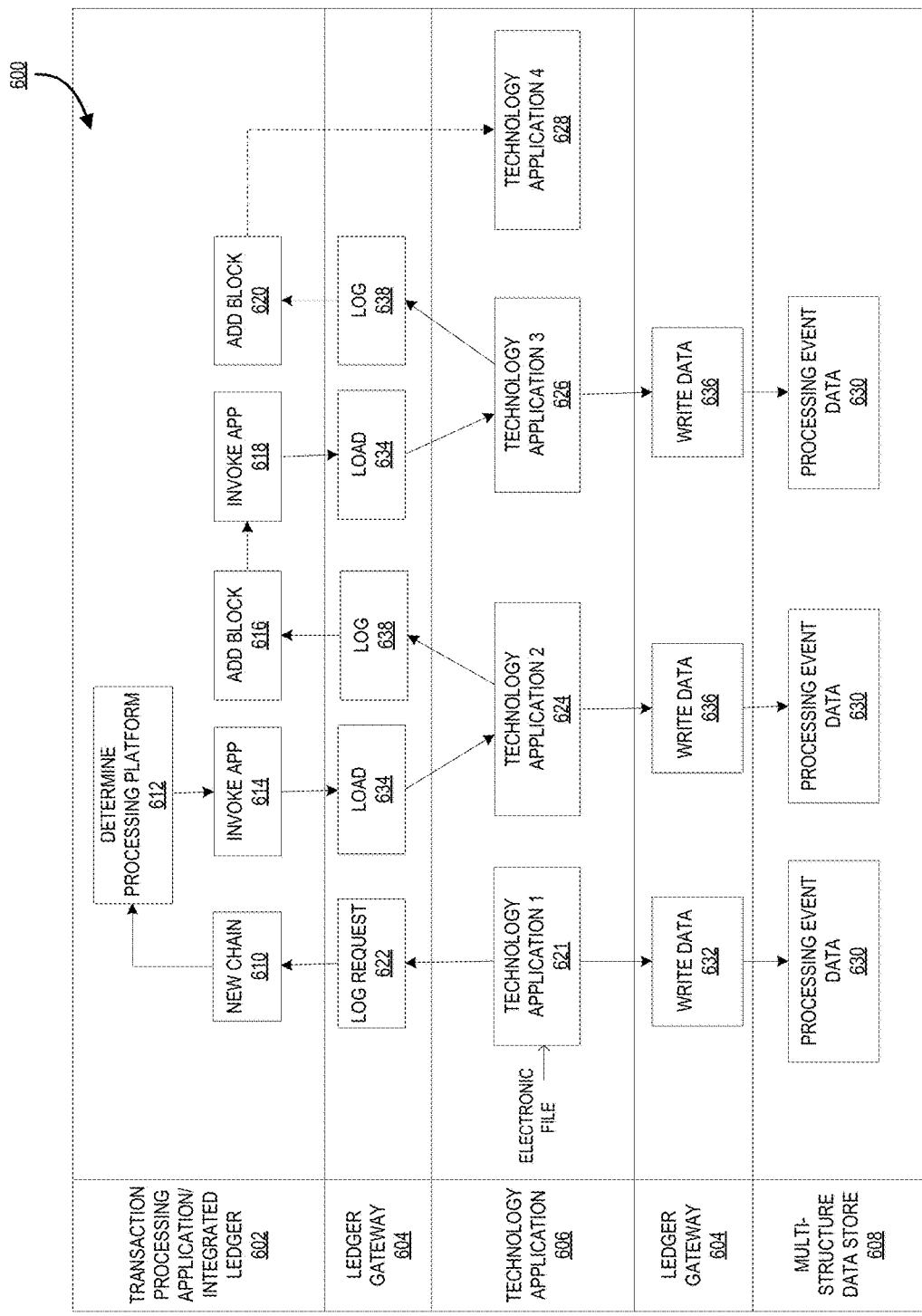
Figure 5:
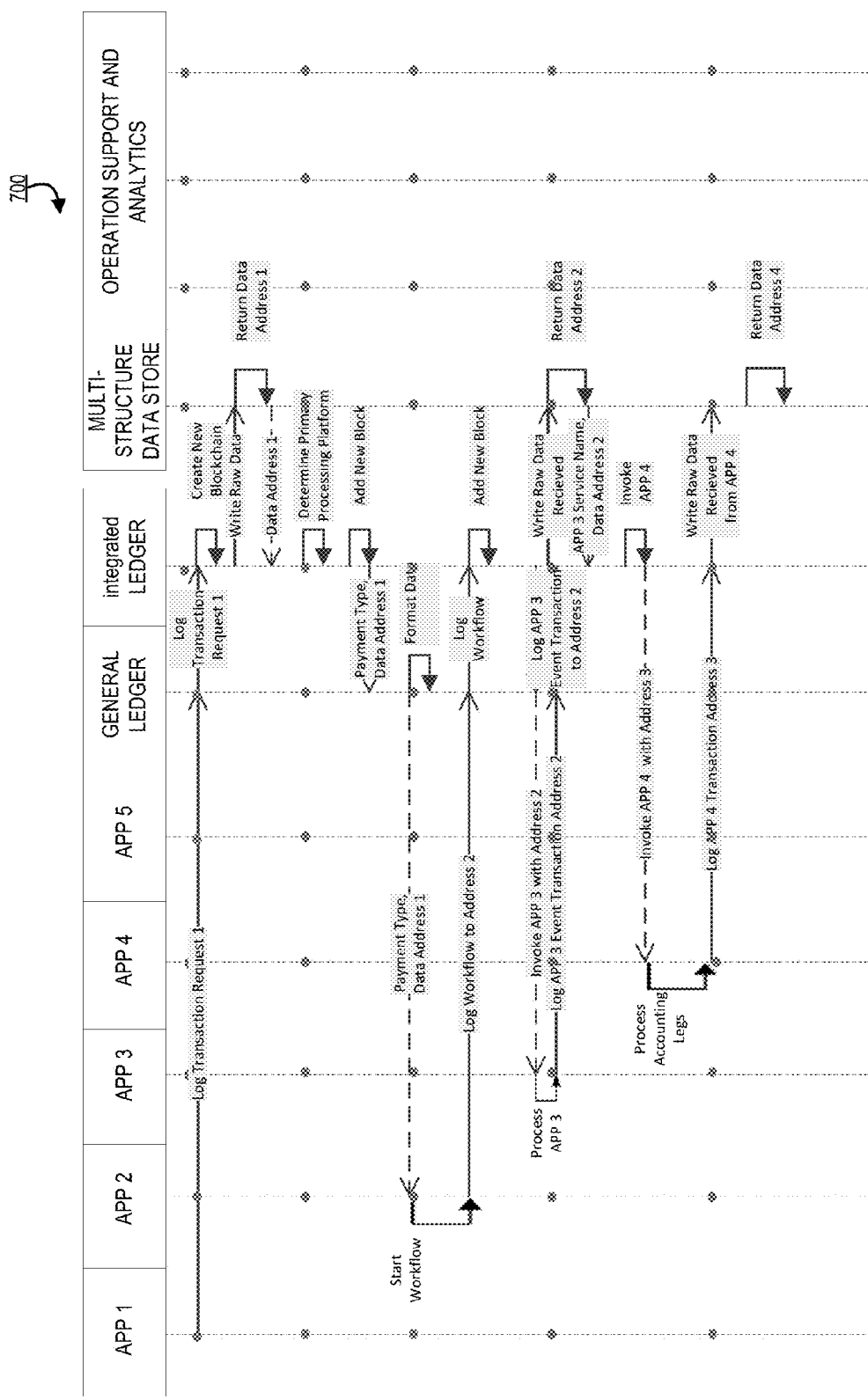
Figure 6:
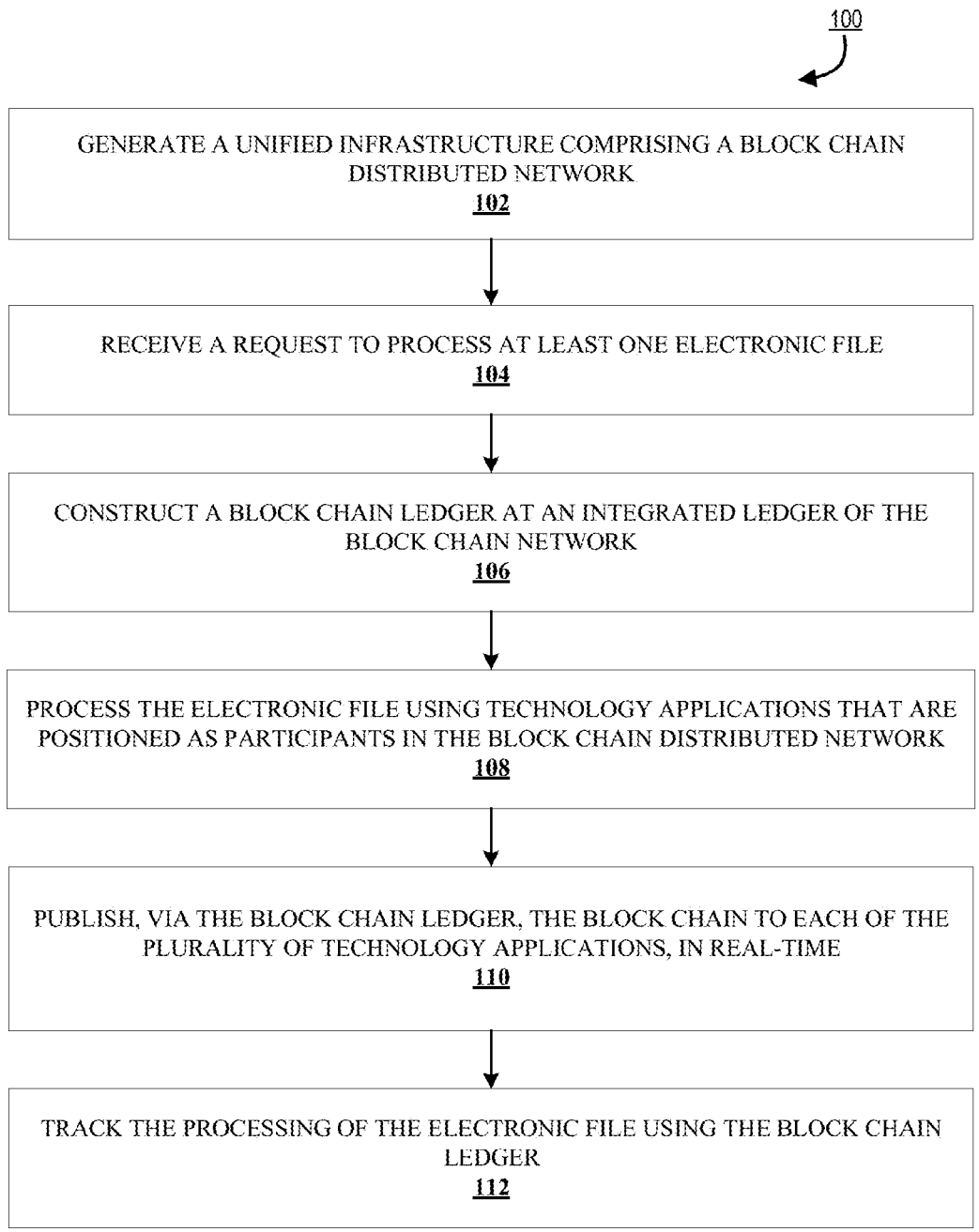

Having thus described embodiments of the invention in general terms, reference will now be made to the accompanying drawings, wherein:

FIG. 1 depicts a block chain system environment, in accordance with one embodiment of the present invention;

FIG. 2A depicts centralized database architecture environment, in accordance with one embodiment of the present invention;

FIG. 2B depicts a block chain system environment architecture, in accordance with one embodiment of the present invention;

FIG. 3 depicts a process map illustrating a block chain system environment, in accordance with one embodiment of the present invention FIG. 4 depicts a process map illustrating a block chain transaction processing process, in accordance with one embodiment of the present invention;

FIG. 5 depicts a detailed flow illustrating block chain transaction processing, in accordance with one embodiment of the present invention. and FIG. 6 depicts a high level process flow illustrating a block chain electronic file processing method, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic records and performing/processing associated technology activities. In some instances, the entity's technology systems comprise multiple technology applications across multiple distributed technology platforms for large scale processing of activity files and electronic records. As such, the entity may be any institution, group, association, financial institution, establishment, company, union, authority or the like, employing information technology resources.

Typically, the multiple distributed technology platforms that are currently used in the large scale processing of electronic files require engagement in expensive and time consuming processes for data transmission, data reformatting, and transformation of entity and activity information stored in the electronic files and records, as the electronic files are processed across the multiple discrete distributed technology platforms. In many instances, processing electronic files and the associated records encompasses performing the associated technology activities. Typically, an electronic file comprising multiple records is processed sequentially by numerous technology applications, with the most current data being transferred from one application to another, via middleware. The data being transferred between applications is often transformed or re-formatted multiple times to be conductive for processing by the subsequent technology application and processing platform. This process often consumes a large amount of processing power, transient and non-volatile memory, valuable processing time, and other resources.

Furthermore, the intricacy of the processing operations via multiple technology applications and platforms, the sheer volume of electronic files being processed at a given time, and the continual transformation of data/information, make it extremely time consuming and infeasible, if not impossible, to track the processing of electronic files themselves, much less determining the processing of specific records of the files and determining the status and content of the data within them. For instance, these concerns are exacerbated in applications involving financial transactions, where each electronic file may comprise hundreds, thousands or tens of thousands of records, each record representing an electronic financial transaction, where real-time determination of the status of the transaction processing and content of the transaction records is desired. Determining the particular stage of processing (for example, determining a current technology application processing the record), and determining the content of the records through the multiple data processing events of numerous applications, in real-time, is not practical in existing systems. As discussed previously, particularly in the case of current financial data processing environments, the complexity of the data staging and movement activities hinders tracking and determining status and content of electronic files being processed at real time or near real-time for each and every activity and completed payment transactions the entity performs. The technology components involved in financial activity and transaction processing typically reside on disparate and unconnected processing platforms that are frequently distributed globally. The disparate and distributed nature of the software components that collectively comprise an end-to-end transaction processing can make the simultaneous tracking and monitoring of large numbers of transactions very difficult.

The present invention is directed to providing a novel technical solution that reduces transactional and informational complexities and transforms the processing of electronic files and management of data contained within such files. Furthermore, the present invention enables real-time tracking of processing technology events associated with individual records and the data contained therein, by implementing the existing data processing applications and technical platforms in a novel technical environment, without requiring replacement of existing data processing applications.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user profile that includes only personal information associated with the user, or the like. The technology resource is typically associated with and/or maintained by an entity.

As used herein, a "user interface" may be a graphical user interface. Typically, a graphical user interface (GUI) is a type of interface that allows users to interact with electronic devices such as graphical icons and visual indicators such as secondary notation, as opposed to using only text via the command line. In some embodiments, the graphical user interface may include both graphical elements and text elements.

As discussed previously, each electronic file often comprises multiple records (for example, hundreds, thousands or tens of thousands of records). Each record may comprise multiple data elements containing data/information regarding an electronic/technology activity. In some instances, each record may comprise technology elements associated with type of activity, instructions for processing the record, technology resources involved, information associated with the users/entities/systems involved, technology applications involved, activity attributes, time, location, person/system that initiated/performed the activity, and/or other aspects. Furthermore, the technology elements may by discrete components of the record, or the technology elements may merely refer to one or more portions of a single data component in a record. Although referred to as "a record", it is understood that, in some embodiments each activity may be associated with multiple records.

For example, in the instances where the electronic files are associated comprise financial information, each electronic file may comprise multiple records, with each record being associated with an electronic activity comprising a financial activity/transaction. Furthermore, each record may comprise one or more technology elements associated with type of activity (for example, debit, credit, resource transfer), instructions for processing the record (for example, type of processing), technology resources involved (for example, initiating resource/financial institution, receiving resource or financial institution, intermediate resource systems, domestic systems, international systems), technology applications/platforms involved (for example, data processing applications, regulatory applications, internal applications), information associated with the users/entities/systems involved (for example, initiating or first user name, first user account identifiers, receiving or second user name, second user account identifiers), activity attributes (for example, resource quantity/amount, inbound and outbound currency), timestamp, and/or other aspects.

An electronic activity, also referred to as a technology activity, for example a "resource transfer" or "transaction", may refer to any activities or communication between a user or entity and the financial institution, activities or communication between multiple entities, communication between technology applications and the like. A resource transfer may refer to a payment, processing of funds, purchase of goods or services, a return of goods or services, a payment transaction, a credit transaction, or other interactions involving a user's account. In the context of a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Alternatively, in some embodiments, the term "transaction" may be used when describing a block chain database as a "transaction" type of record. In this regard, the transaction type record typically comprises the electronic activity data stored in the block chain, with the term transaction referring to the content stored in the block chain.

As discussed previously, embodiments of the present invention alleviate the deficiencies of existing systems and achieve other advantages by providing apparatuses (e.g., a system, computer program product and/or other devices) and methods for reducing transactional and informational complexities and transforming the processing of electronic files and management of data contained within them. Furthermore, the present invention enables real-time tracking of processing activities performed on individual records and the data contained therein, by implementing the existing data processing applications and technical platforms in a novel technical environment, without requiring replacement of existing data processing applications. Specifically, the present invention is embodied in technology apparatuses (e.g., a system, computer program product and/or other devices) and methods for establishing existing/legacy technology applications and/or other technology applications and/or platforms as nodes or participants on a distributed database network or block chain fabric for direct and real-time visibility into discreet activity processing events associated with the processing of the electronic files for tracking and monitoring of end-to-end processing status.

FIG. 1 illustrates a block chain system environment 200, in accordance with one embodiment of the present invention. As illustrated in FIG. 1, a block chain distributed network system 208 is operatively coupled, via a network 201 to a user device 204, and to an entity server 206. In this way, the block chain distributed network system 208 can send information to and receive information from the user device 204 and the entity server 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers. In this way, applications may be built as nodes and/or ledgers of the block chain in order to have access to data within the block chain server.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 may be one or more individuals or entities that may desire access to the data on the distributed network of the block chain. As such, in some embodiments, the user 202 may be associated with the entity and/or a financial institution that may desire one or more data points stored within the block chain network for payment or global payment processing.

In some embodiments, the user 202 has a user device, such as a mobile phone, tablet, or the like. FIG. 1 also illustrates a user system 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The user device 204 is typically a computing system that provides authentication for resource viewing. The processing device 214 is operatively coupled to the communication device 212 and the memory device 216. The processing device 214 uses the communication device 212 to communicate with the network 201 and other devices on the network 201, such as, but not limited to, the entity server 206 and the block chain distributed network system 208. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222.

As further illustrated in FIG. 1, the block chain distributed network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the entity server 206 and the user system 204. As such, the communication device 246 generally comprises a modem, server, or other device for communicating with other devices on the network 201.

As further illustrated in FIG. 1, the block chain distributed network system 208 comprises computer-readable instructions 254 stored in the memory device 250, which in one embodiment includes the computer-readable instructions 254 of a resource application 258. In some embodiments, the memory device 250 includes data storage 252 for storing data related to the system environment, but not limited to data created and/or used by the resource application 258. The resource application 258 is configured to perform or cause other systems and device to perform the various steps in processing electronic records using a block chain distributed network.

Embodiments of the block chain distributed network system 208 may include multiple systems, servers, computers or the like maintained by one or many entities. FIG. 1 merely illustrates one of those systems that, typically, interacts with many other similar systems to form the block chain. In one embodiment of the invention, the block chain distributed network system 208 is operated by a second entity that is a different or separate entity from the entity server 206. In some embodiments, the entity server 206 may be part of the block chain distributed network system 208. Similarly, in some embodiments, the block chain distributed network system 208 is part of the entity server 206. In other embodiments, the entity server 206 is distinct from the block chain distributed network system 208.

In one embodiment of the block chain distributed network system 208, the memory device 250 stores, but is not limited to, a resource application 258 and a distributed ledger. In some embodiments, the distributed ledger stores data including, but not limited to, smart contract logic and rules. In one embodiment of the invention, both the resource application 258 and the distributed ledger may associate with applications having computer-executable program code that instructs the processing device 248 to operate the network communication device 246 to perform certain communication functions involving described herein. In one embodiment, the computer-executable program code of an application associated with the distributed ledger and resource application 258 may also instruct the processing device 248 to perform certain logic, data processing, and data storing functions of the application.

The processing device 248 is configured to use the communication device 246 to gather data, such as data corresponding to transactions, blocks, or other updates to the distributed ledger from various data sources such as other block chain network system. The processing device 248 stores the data that it receives in its copy of the distributed ledger stored in the memory device 250.

In the embodiment illustrated in FIG. 1 and described throughout much of this specification, the resource application 258 may perform one or more of the functions described herein.

As illustrated in FIG. 1, the entity server 206 is connected to the block chain distributed network system 208 and may be associated with a financial institution network. In this way, while only one entity server 206 is illustrated in FIG. 1, it is understood that multiple network systems may make up the system environment 200 and be connected to the network 201. The entity server 206 generally comprises a communication device 236, a processing device 238, and a memory device 240. The entity server 206 comprises computer-readable instructions 242 stored in the memory device 240, which in one embodiment includes the computer-readable instructions 242 of an institution application 244. The entity server 206 may communicate with the block chain distributed network system 208. The block chain distributed network system 208 may communicate with the entity server 206 via a secure connection generated for secure encrypted communications between the two systems for communicating data for processing across various applications.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2A illustrates a centralized database architecture environment 300, in accordance with one embodiment of the present invention. The centralized database architecture comprises multiple nodes from one or more sources and converge into a centralized database. The system, in this embodiment, may generate a single centralized ledger for data received from the various nodes. The data may be associated with the ledger and be accessible by one or more users.

FIG. 2B provides a block chain system environment architecture 400, in accordance with one embodiment of the present invention. Specifically, FIG. 2B illustrates a distributed block chain configuration or architecture that is configured to facilitate technology application positioning as participants/nodes in the block chain in order to allow data use across applications that are nodes of the block chain network. As such, technology applications may be stored on the network and the data may be utilized between the applications such that data does not need to be consistently transmitted between technology applications, and processed, formatted, transformed and/or stored by middleware between technology applications across the network for electronic file processing. This configuration enables accurate tracking, monitoring, and analysis of the status of each electronic/technology activity and the data contents of the associated technology record(s).

A block chain or blockchain is a distributed database that maintains a secure list of data records, the list of data records being configured to impede tampering and being configured to be continuously appended with additional "blocks". A block chain typically comprises data structure blocks (also referred to as "blocks") that are configured to hold electronic data or transactions. The transactions or content of the blocks, as discussed herein, may comprise electronic activity data and/or technology programs. In some embodiments the blocks hold time stamped batches of transactions/records (one or more transactions/records), the timestamps relating to the block itself (time of creation, time of validation, time of liking to existing chains and the like) or the transactions contained within. In some embodiments, each block of a block chain comprises a hash of the prior block of the block chain, linking the two blocks and thus forming the block chain. In some embodiments, a new block may be linked or appended to another block or a block chain by a node with requisite authorization, after validation or authentication of the new block. In some instances, the validation/authentication is performed by nodes of the distributed network that the block chain is implemented in, based on predetermined criteria. In some embodiments, a successor block may be linked to only one predecessor block of a block chain, thereby creating a chain linking structure, although other linking structures are employed in other embodiments. Block chain databases are typically employed across distributed networks comprising multiple nodes. In some embodiments, the blocks of the block chain are typically maintained cryptographically through requirement of keys and signatures at the nodes for access, manipulation and control of data, to ensure the security of the stored data.

A block chain typically includes several nodes, which may be one or more systems, machines, computers, databases, data stores or the like operatively connected with one or more other nodes. One prevalent application of block chain is the public ledger of transactions for cryptocurrencies. In cryptocurrency block chains, each system/server associated with a particular user/entity forms a node of the distributed network, with multiple user/entity systems constituting the network. Typically, the currency transactions are stored in the block chain only after completion and validation of the transaction. The validated blocks are enforced cryptographically. However, such a system does not enable processing of electronic files as discussed previously, or determination of the status and content of a particular electronic record/technology activity in real time as the electronic files are processes across multiple technology platforms and applications. The present invention, however, embodies a unique novel implementation of distributed networks with technology applications forming the nodes or being the participants of the network. In some embodiments, the network may encompass multiple systems/servers, with system/server comprising one or more technology applications.

As discussed with respect to FIG. 2B, in some embodiments, a block chain system 400 may be decentralized such that a distributed ledger 402 (i.e., a decentralized ledger) containing activity processing events associated with processing of electronic files is maintained on multiple nodes 405-408 of the block chain system 400. In some embodiments, the nodes in the block chain may have a copy of at least a portion the ledger or set of transactions and/or blocks on the block chain. Activity processing events associated with the various discrete events involved in processing of each activity or associated records are stored on the block chain that is typically available to all technology applications in real time, without requiring application to application notifications and data formatting and transfer via middleware. In some embodiments, the nodes/technology applications are configured to validate a transaction, add the processing event as a block to the block chain, and/or broadcast the activity, its validation (in the form of a block) and/or other data to other nodes. The transactions in the block may include time-stamping, such as is used in cryptocurrency block chains. In some embodiments, the nodes/ technology applications may additionally construct a global ledger or global block chain to be stored in a Multi-Structure Data Store. A multi-structure data store is a specialized storage structure in communication with block chain system. In some instances, the multi-structure data store is another participant/node in the distributed network. In some embodiments, the multi-structure data store is configured to store at least a portion of the received electronic files. In some embodiments, in addition to the above, the multi-structure data store is configured to store transformed record data from each processing event of a technology application, data generated by various technology applications, and the like in a predetermined format. In some instances, the block chain data of the integrated ledger comprises time stamped processing event logging data comprising the current event information, updated record and the like, while the multi-structured data store may record all the processing information comprising the processing event logging data, data outputs from the technology application, for future use.

In some embodiments, the nodes 405-408 of the system might be financial institutions that function as gateways for other financial institutions. For example, a credit union might hold the account, but access the distributed system through a sponsor node. Furthermore, the block chain 400 may perform one or more of the steps or functions performed by the block chain distributed network system as discussed above with reference to FIG. 1.

FIG. 3 illustrates a block chain system environment 500, in accordance with one embodiment of the present invention. As illustrated in FIG. 3, the system comprises a unified block chain infrastructure with technology applications established in a distributed block chain network at participants/nodes. Specifically, the system constructs an integrated ledger, registers technology applications configured for electronic record/activity processing on the integrated ledger as participants or nodes, implements a multi-structure electronic activity data store, establishes standardized ledger gateway services configured for data staging and transformation, and performs block chain construction, management and workflow control, as will be described in detail below.

As illustrated by FIG. 3, the system identifies a plurality of legacy technology applications associated with processing of electronic records. Typically, processing of electronic records comprises performing the technology activity(s) associated with the electronic record. The system then establishes the two or more technology applications 513-521 as participants in the distributed block chain network 500. For example, each of Application 1 513, Application 2 514, Application 3 515, Application 4 516, Application 5 517, Application 6 518, Application 7 519, Application 8 520, and/or Application 9 521 are established as participants to the block chain network. For example, in the instances where the present block chain system is employed in a financial transaction processing environment, the technology applications may provide data processing related to validation, payment processing, authentication, reporting, or the like for each of the records.

Furthermore, as illustrated, the system further establishes a ledger gateway system comprising one or more ledger gateways (413-421) for each corresponding technology application (513-521) to facilitate operative commination between the technology applications (513-521) and the block chain network infrastructure for establishing an integrated ledger 522 and a multi-structure data store 508. Although illustrated as distinct nodes, in some embodiments, a plurality of technology applications may be associated with a single ledger gateway. In some embodiments, either a user and/or an entity may utilize the block chain network, initiate processing of electronic files/records, determine status or processing events associated with processing of the electronic records and the like. In this regard, the system may further establish communication channels between a user system 502, and/or an entity system 504 and the block chain infrastructure through a network, such as the network 201. The system may further establish ledger gateways 402 and 404 to facilitate communication between the block chain network and the user system 502 and the entity system 504 respectively.

Ledger gateways, as used herein, are network nodes that are configured for communicating using more than one protocols and are configured for interfacing with other networks/systems that utilize different protocols. In some embodiments, the ledger gateways comprise devices such as protocol translators, impedance matching devices, rate converters, fault isolators, or signal translators for system interoperability. In some embodiments the ledger gateways are electronic gateways and may be at least partially embodied in computer programs or applications. In some embodiments, the ledger gateways are protocol converters configured to convert the protocol of technology applications, user and entity systems, and the like to a predetermined protocol suitable for block chain operations in the network. In this regard, the ledger gateways may convert the data format associated with user and entity systems (for example, Extended Binary Coded Decimal Interchange Code (EBCDIC), Extensible Markup Language (XML), Unicode and the like), technology applications (for example, Extensible Markup Language (XML), the like) into a predetermined data format associated with block chain operations (for example, JavaScript Object Notation (JSON)), and vice versa. In some embodiments, ledger gateways associated with technology applications are configured to convey, retrieve and/or store the block chain transactions associated with processing events from the integrated ledger, such that the blocks of transactions associated with processing events stored in the integrated ledger 522 are automatically available to all technology applications, in real-time or near real-time.

For example, after processing a received electronic record, technology application 1 at 513 may log a request event, via ledger gateway 413, with a request type address of a transaction processing application of the system associated with the integrated ledger 522. The system may then create a new block chain at the integrated ledger 522, determine a primary processing platform for the received record and its associated applications, and add a block to the block chain of the integrated ledger 522 identifying the processing event of preprocessing the record and the next appropriate processing application or platform. This new block chain and the newly added block associated with the first processing event is automatically published and is available to all technology applications including application 1 (for example, via their respective ledger gateways), in real-time or near real-time. Since even subsequent technology applications are current and comprise the current processing event data in real-time, logging of the new block at the integrated ledger, automatically triggers the next technology application (for example, technology application 8) associated with the identified primary processing platform, without requiring separate invocation of the application by either application 1 or another central application and without requiring transfer of electronic record data to the next application from application 1, thereby reducing processing speed, memory requirements, reducing data reformatting requirements, and processing resources. In some instances, the stored new block may comprise specialized code configured to trigger the next technology application associated with the subsequent processing event so that once published to all the technology applications, the next technology application is automatically triggered when the code is read and/or executed by the appropriate technology application. In some instances, the stored new block may comprise information indicating the next technology application for the next processing event so that once published to all the technology applications, the next technology application is automatically triggered when the block data is read by the application.

Specifically, the present invention enables all technology applications to be current without requiring data transfer back and forth between multiple applications after various processing events. The present invention further enables identification of the specific processing event associated with a specific record at the integrated ledger 522 and enables tracking of processing of the record through multiple applications and the associated processing events, without requiring transmission of multiple requests to the technology applications.

In some embodiments, the system may further record or store the transformed content/data of the record after the processing at application 1 at the multi-structure data store 508, via the ledger gateway 408. Therefore, the system enables storing and retrieval of the transformed record processing data without requiring it to be transmitted to the subsequent technology applications from application 1 for further processing of the record/technology activity. In some embodiments, data attributes and elements associated with the content of the processed records that are received and processed during each electronic activity are stored in the multi-structure data store 508 in a predetermined format or a raw format. This data store 508 is configured to ensure that the system has a complete and accurate history of each and every processing activity and event. In some embodiments the system further comprises real-time analytics tools that are configured to mine the raw data to provide the desired performance metrics. In some embodiments, the data is provided to the technology applications when required for processing, with no middleware and in real-time.

Subsequently, the process continues once the next technology application has performed its function in the process. The system may add a block to the chain indicating the processing event, and provide an indication that the data is ready for processing to the next application on the block chain. These technology operations will be described in detail with respect to FIG. 4.

As such, once the data is processed through the technology applications, the logging of the final block at the integrated ledger 522, and/or instructions/data transmitted from the system initiates processing by the final processing application 512, via ledger gateway 412. In some embodiments, the processing application 512 is associated with an external entity 510, such as a clearing house system. In this regard, the system may transmit only a portion of the current processed data of the record to the application 512, via a global action, without making the block chain 522 or the multi-structure data store 508 available to the processing application 512 to ensure the security of the record data.

At the processing application 512, the process continues to log the next processing event such as a payment via a global ledger 524 for other entities 510 to gain access to the data cleared for the global ledger 524. For example, once a payment is processed or a posted the system may present clearance of the data or the payments for other authorized entities to visualize the information. In some embodiments, the global ledger may take the form of another block chain.

FIG. 4 illustrates a process map 600 for block chain electronic activity processing, in accordance with one embodiment of the invention. As discussed herein, the technology applications 606, ledger gateways 604, and multi-structure data store 608 are similar to the technology applications (513-521), ledger gateways (413-421) and multi-structure data store 508 discussed with respect to FIG. 3. As illustrated, the process 600 is initiated on receiving an electronic file at technology application 1. This electronic file may be received from user systems or entity systems as discussed previously. At step 621, the technology application processes the electronic file and identifies a plurality of activity records (for example, thousands or tens of thousands) contained within. For each record (for example a record associated with a technology activity such as processing, payment and the like), the technology application 1, via the associated ledger gateway, logs a request event with the transaction processing application, with a request type address to log data at an address 1 of the integrated ledger 602 at step 622. A transaction processing application is typically configured to perform one or more functions associated with the integrated ledger. In response, at step 610, the transaction processing application of the system creates a new block chain at address 1 for processing of the record with a unique identifier for the record at the integrated ledger. In some embodiments, the ledger gateway 604 may further write the processing event data comprising contents of the retrieved record, the log request 622, the data address 1 and the like to the multi-structure data store at step 632. The processing event data may be stored by the multi-structure data store 608 in a raw format at step 630. In some embodiments, the two ledger gateways 604 depicted in FIG. 4, the first performing various steps by interacting with the integrated ledger 602 and the technology applications 606, and the second performing steps by communicating with the multi-structure data store 608 may be a single ledger gateway for each application or a single ledger gateway for two or more applications.

The transaction processing application may then determine a primary processing platform for the record at step 612. The processing platform may include one or more applications that are required by the system to complete the processing of the record. Determining the primary processing platform typically comprises analyzing the record, determining the type of activity, determining the format of the data and identifying associated processing platforms and the technology applications associated with the platform. Once the appropriate platform is determined, the system may invoke the technology application 2 associated with the determined platform, as illustrated by step 614. In some embodiments, invoking the application comprises transmitting the data address 1 of the block chain 610. The ledger gateway associated with the application 2 receives the data address, and loads the block data from the ledger 602 in a temporary memory location, transforms the data into a suitable format compatible with technology application 2 (for example, from JSON to EBCIDIC), and then routes the data to application 2 and loads the data at a memory location of application 2, at step 634. At step 624, the technology application 2 processes the record activity. In some embodiments, the technology applicant 2 may retrieve at least a portion of the processing event data stored in the multi-structure data store 608. After completion of the processing, at step 638, the ledger gateway associated with the application 2 logs the processing event and transmits a data address 2 to the transaction processing application 602. In some embodiments, logging the processing event at 638 comprises transforming the transaction information associated with the processing event, i.e. content to be stored/logged in a new block to a format compatible with integrated ledger 522 (for example, from EBCIDIC to JSON, or from XML to JSON). The transaction processing application then adds a new block to the block chain at address 2 of the ledger 602, at step 616, the block comprising the formatted event data. In some embodiments, adding a new block and/or logging a processing event comprises time stamping the transaction data that is added as the block or logged. In some embodiments, this new block created at step 616 is validated by one or more of the preceding application prior to linking with the existing chain, in this instance by application 1. The block chain of step 610 comprising the new block created at step 616, is automatically available to/accessible by all technology applicants 1, 2, 3 . . . , in real-time. Next, the ledger gateway associated with application 2 may further write the processing event data comprising the current record data after transformation/processing by application 2, output data associated with processing operations conducted by the application and the like to the multi-structure data store at step 636. The processing event data may be stored by the multi-structure data store 608 in a raw format at step 630. In some embodiments, the conversion to raw data format is performed by the ledger gateway.

Creation of the new block at step 616 at the block chain, automatically triggers the subsequent technology application 3, at step 610. The subsequent steps are substantially similar to the steps described with respect to application 2. Technology application 3 may process the record, add a block at step 620 to the block chain and the like. This process may continue for Application 4, 5, . . . , and the like at step 628 before processing by external processing applications 512. This allows the system to perform real-time analytics via an end-to-end real-time data analytics platform for all processing events of multiple records and multiple electronic files simultaneously, and all data attributes for each electronic activity digital information management ecosystem. Furthermore, the system may generate a hyper ledger to perform sequencing and electronic activity logging for the block chain. Furthermore the system may construct a multi-storage data store and utilize the ledger gateway for real-time analytics. In some embodiments, the invention for a new transactional processing model is the multi-structure data store. The data store is configured to provide standard core services that will directly and efficiently import unstructured or structured data. The data store is configured to provide a complete analytics desktop display at a user device that will offer data analytics through the system. A detailed process flow illustrating the block chain electronic activity processing for an illustrative example of processing financial transactions is provided in FIG. 5.

FIG. 5 illustrates a detailed flow for block chain financial transaction processing 700, in accordance with one embodiment of the present invention. As illustrated in the process 700, each technology application is presented along an axis as a participant in the block chain. Each bullet located in the process corresponds to a processing event. In this way, the system may comprise technology applications for a process participating in the block chain, such that data may be stored and processed through each application without requiring middleware or the like for the processing. Furthermore, all data may be formatted for acceptance by and processing by the applications on the block chain. In this way, the applications are participants of the block chain and the data is provided and passed through the applications on the block chain network.

FIG. 6 provides a high level process flow 100 illustrating a method for processing electronic files in a block chain system, in accordance with one embodiment of the present invention. The processing method 100 is substantially similar to the technology infrastructure and processing steps described with respect to FIGS. 3-5. As such the system may be configured to perform one or more of steps 102-112 described herein. As an initial step, as illustrated in block 102, the system is configured to construct a unified infrastructure comprising a block chain distributed network. In some embodiments, the system determines a plurality of technology applications associated with processing of electronic files. As discussed previously, processing of electronic files and particularly executing the technology activities associated with the records in the files often requires operations by multiple technology applications, for example, in a sequential manner. As an illustrative example, an electronic file may be associated with financial transaction comprising multiple records associated with payments, remittances, disbursements, account transfers and the like. Each record may comprise information associated with the technology activity, i.e., the payment transfer, such as account identifiers, technology platform information and the like. Each of these records is often required to be processed by multiple applications one after another to accomplish the payment transfer. For instance, a certain technology application may analyze the record, and determine an appropriate processing platform, for example, platforms for domestic transfers, international transfers and the like. The processing platform may in turn comprise multiple technology applications that are required for processing the transaction. For instance the technology applications may comprise one or more of: an application for sanction processing, an application for resource availability verification/checking, an application for payment request clearance, an application for routing payments to clearing platforms, an application for reconciling cleared and settled payments, an application for generating process reports and metrics and the like. Each step of processing by a technology application is a processing event, and a series of processing events may result in the completion of the activity.

As discussed previously, the system establishes a distributed block chain network comprising the plurality of technology applications as nodes of the block chain network. Specifically, the system positions/registers the plurality of technology applications as participants of the block chain network. This block chain network comprises an integrated ledger that is accessible to the participant nodes, i.e., the plurality technology applications. In addition, the system may establish a ledger gateway system. The ledger gateway system is typically configured for establishing communication between the plurality of technology applications and the integrated ledger. The ledger gateway system comprises protocol converters configured for transforming data, and block chain transaction data in particular, as the data is received at the technology application and re-transforming the processing event data for logging as a block, or storing in a multi-structure data store.

Next, the system may receive a request to process an electronic as indicated by block 104, wherein, typically the electronic file comprises one or more activity records. As such, the unified infrastructure is configured to process electronic files and the records contained within, and perform the associated technology activity, while also being configured to log, track and monitor each discrete processing event associated with processing electronic records. This unified infrastructure is configured to create an internal technology fabric for housing a block chain associated with processing of each electronic record with a distinct block for each processing event and/or for each technology application associated with the technology activity.

The system that constructs a block chain ledger, at block 106. In this regard, the system creates a block chain ledger specific to the activity record being processed at a specific data location of the integrated ledger of the block chain network. For each activity record of the file, the system assigns a unique identifier and transmitting control instructions to an appropriate technology application to initiate the first processing event, as discussed previously. As illustrated by block 108, the system processes the electronic file using technology applications that are positioned as participants of the block chain network, in an appropriate/predetermined sequence. The system then constructs a block chain ledger at a first data location of the integrated ledger to log the time stamped processing events. The system is typically configured to add blocks to the block chain to log subsequent processing events. In this regard, the ledger gateway, may transform transaction data associated with the processing event into a predetermined format compatible with the integrated ledger, log the transaction data associated with the processing event at a data location, transmit the second data location to a transaction processing application associated with the integrated ledger causing the addition of the first block comprising the transaction data to the block chain ledger.

Next, the system publishes the block chain ledger to each of the plurality of technology applications, in real-time or near real-time, as illustrated by block 110. These blocks are published to all other technology applications, in real-time, via the block chain since the applications are participants on the network. In some embodiments, each technology application comprises a copy of the block chain, which is constantly updated based on the execution of processing events. Therefore, all the technology applications are current and are updated, in real-time without requiring cumbersome operations of transmitting data between the multitude of applications. Furthermore, the system is configured such that, adding and/or validating a block associated with a processing event is configured to trigger, automatically, the next processing event by the next technology application, without requiring transfer of data to subsequent applications.

As such, the invention allows application utilization of transactional data without relocation of record data. As discussed previously, each record of the electronic file comprises a large number of attributes associated with the technology activity. Each technology application often requires a portion of the record attributes and modified or appended attribute data from preceding applications for completion of the processing event. In conventional systems, since the record is processed sequentially by the applications, the record data is required to be transmitted from one application to the succeeding application to preserve the modifications made by the preceding application. This application to application data transfer delays the processing, consumes a large portion of resources for the data transfer, results in technology applications without access to current data since applications preceding a particular processing event and applications succeeding the event do not have access to the most recent record data, require middleware to store data between transmission to applications. As discussed previously, the present invention alleviates the above concerns and provides an improvement to electronic file processing by employing a block chain distributed network with the technology applications as participants. The block chain ledger updates the processing events in real-time, ensures that all applications are current and does not require cumbersome processing and data transfer. Furthermore, the technology applications may utilize large amounts of data without moving the data through middleware and/or across one or more networks.

As illustrated in block 112, the invention may manage end-to-end processing the electronic files. Specifically the system is configured to orchestrate, instantiate, and track application processing events that are required to successfully complete the end-to-end processing workflow. In some instances, the system may receive a request, for example from a user system, to determine the processing event status of a particular activity record. Typically, the system first determines the unique identifier for the first activity record and accesses the integrated ledger to identify a block chain associated with the unique identifier. The system may then identify a most current block of the block chain to determine the status of the processing. In this regard, the system may also determine a current processing event associated with the current block and determine the particular technology application associated with the event. In addition, the system may determine other performance metrics like percentage completion of the processing, the succeeding technology applications that are yet to process the record and the associated future processing events, estimated completion time for the future processing events and the like. The system may then initiate a presentation of the current processing event along with the performance metrics on a display associated with a user system.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

U.S. patent application Ser. No. 15/252,761 (now U.S. Patent Application Publication No. 2017/0295232) to Curtis, entitled "System for transforming large scale electronic processing using Application Block Chain," is filed concurrently herewith, and is hereby incorporated by reference in its entirety.

The invention claimed is:

1. A system for processing electronic files using a plurality of technology applications, via a block chain distributed network, the system comprising:
   a distributed block chain network comprising a plurality of technology applications as participants;
   at least one memory device with computer-readable program code stored thereon;
   at least one communication device;
   at least one processing device operatively coupled to the at least one memory device and the at least one communication device, wherein executing the computer-readable code is configured to cause the at least one processing device to:
      establish an integrated ledger for the distributed block chain network comprising the plurality of technology applications as participants;
      receive a request to process at least one electronic file, wherein the at least one electronic file comprises one or more activity records;
      process the at least one electronic file using the plurality of technology applications, wherein processing, for each activity record of the one or more records, comprises:
         constructing a block chain ledger at a first data location of the integrated ledger;
         initiating a first processing event comprising processing the activity record using a first technology application of the plurality of technology applications; and
         creating a first block on the block chain ledger associated with the first processing event;
         wherein creating the first block associated with the first processing event is configured to trigger, automatically, a second processing event comprising processing the activity record by a second technology application of the plurality of technology applications.

2. The system of claim 1, wherein the distributed block chain network further comprises:
   a ledger gateway system, wherein the ledger gateway system is configured for establishing communication between the plurality of technology applications and the integrated ledger;
   wherein each of the plurality of technology applications is a participant node of the distributed block chain network;
   wherein the ledger gateway system comprises protocol converters configured for communicating using two or more protocols.

3. The system of claim 1, wherein the distributed block chain network further comprises a multi-structure data store configured for storing the activity record and processing data associated with the first processing event.

4. The system of claim 1, wherein constructing, for each activity record, the block chain ledger at the first data location of the integrated ledger further comprises:
   assigning a unique identifier for the activity record;
   determining a primary processing platform for the activity record;
   determining the first technology application associated with the primary processing platform; and
   transmitting control instructions to the first technology application to initiate the first processing event.

5. The system of claim 1, wherein creating the first block on the block chain ledger associated with the first processing event further comprises:
   transforming, via a ledger gateway system, transaction data associated with the first processing event into a predetermined format compatible with the integrated ledger;
   logging, via the ledger gateway system, the transaction data associated with the first processing event at a second data location;
   transmitting, via the ledger gateway system, the second data location to a transaction processing application associated with the integrated ledger;
   adding, via the transaction processing application, the first block comprising the transaction data to the block chain ledger; and
   validating, via at least one of the plurality of technology applications, the first block.

6. The system of claim 1, wherein executing the computer-readable code is configured to further cause the at least one processing device to:
   receive a request to determine processing event status of a first activity record of the one or more activity records;
   determine, a unique identifier for the first activity record;
   access, via the integrated ledger, a first block chain associated with the unique identifier;
   identify a current block of the first block chain;
   determine a current processing event associated with the current block of the first block chain, wherein determining the current processing event comprises determining a current technology application associated with the current block; and
   initiate a presentation of the current processing event on a display associated with a user system.

7. The system of claim 1, wherein creating a first block on the block chain ledger associated with the first processing event further comprises:
   publishing, via the block chain ledger, the first block to the plurality of technology applications, wherein the first block is available to each of the plurality of technology applications, in real-time;
   wherein publishing the first block to the plurality of technology applications, in real-time, is configured to trigger, automatically, the second processing event.

8. The system of claim 1, wherein processing the activity record further comprises:
   determining the second processing event comprising processing the activity record using the second technology application, wherein the second processing event is triggered, automatically, based on creating the first block on the block chain ledger; and
   creating a second block on the block chain ledger associated with the second processing event;
   wherein creating the second block associated with the second processing event is configured to trigger, automatically, a third processing event comprising processing the activity record by a third technology application of the plurality of technology applications.

9. A computer program product for processing electronic files using a plurality of technology applications, via a block chain distributed network, the computer program product comprising a non-transitory computer-readable storage medium having computer-executable instructions to:

establish an integrated ledger for a distributed block chain network comprising a plurality of technology applications as participants;

receive a request to process at least one electronic file, wherein the at least one electronic file comprises one or more activity records;

process the at least one electronic file using the plurality of technology applications, wherein processing, for each activity record of the one or more records, comprises:

constructing a block chain ledger at a first data location of the integrated ledger;

initiating a first processing event comprising processing the activity record using a first technology application of the plurality of technology applications; and creating a first block on the block chain ledger associated with the first processing event;

wherein creating the first block associated with the first processing event is configured to trigger, automatically, a second processing event comprising processing the activity record by a second technology application of the plurality of technology applications.

10. The computer program product of claim 9, wherein the distributed block chain network further comprises:

a ledger gateway system, wherein the ledger gateway system is configured for establishing communication between the plurality of technology applications and the integrated ledger;

wherein each of the plurality of technology applications is a participant node of the distributed block chain network;

wherein the ledger gateway system comprises protocol converters configured for communicating using two or more protocols.

11. The computer program product of claim 9, wherein the distributed block chain network further comprises a multi-structure data store configured for storing the activity record and processing data associated with the first processing event.

12. The computer program product of claim 9, wherein constructing, for each activity record, the block chain ledger at the first data location of the integrated ledger further comprises:

assigning a unique identifier for the activity record;

determining a primary processing platform for the activity record;

determining the first technology application associated with the primary processing platform; and transmitting control instructions to the first technology application to initiate the first processing event.

13. The computer program product of claim 9, wherein creating the first block on the block chain ledger associated with the first processing event further comprises:

transforming, via a ledger gateway system, transaction data associated with the first processing event into a predetermined format compatible with the integrated ledger;

logging, via the ledger gateway system, the transaction data associated with the first processing event at a second data location;

transmitting, via the ledger gateway system, the second data location to a transaction processing application associated with the integrated ledger;

adding, via the transaction processing application, the first block comprising the transaction data to the block chain ledger; and validating, via at least one of the plurality of technology applications, the first block.

14. The computer program product of claim 9, wherein the non-transitory computer-readable storage medium further comprises computer-executable instructions to:

receive a request to determine processing event status of a first activity record of the one or more activity records;

determine, a unique identifier for the first activity record;

access, via the integrated ledger, a first block chain associated with the unique identifier;

identify a current block of the first block chain;

determine a current processing event associated with the current block of the first block chain, wherein determining the current processing event comprises determining a current technology application associated with the current block; and initiate a presentation of the current processing event on a display associated with a user system.

15. A method for processing electronic files using a plurality of technology applications, via a block chain distributed network, the method comprising:

establishing an integrated ledger for a distributed block chain network comprising a plurality of technology applications as participants;

receiving a request to process at least one electronic file, wherein the at least one electronic file comprises one or more activity records;

processing the at least one electronic file using the plurality of technology applications, wherein processing, for each activity record of the one or more records, comprises:

constructing a block chain ledger at a first data location of the integrated ledger;

initiating a first processing event comprising processing the activity record using a first technology application of the plurality of technology applications; and creating a first block on the block chain ledger associated with the first processing event;

wherein creating the first block associated with the first processing event is configured to trigger, automatically, a second processing event comprising processing the activity record by a second technology application of the plurality of technology applications.

16. The method of claim 15, wherein the distributed block chain network further comprises:

a ledger gateway system, wherein the ledger gateway system is configured for establishing communication between the plurality of technology applications and the integrated ledger;

wherein each of the plurality of technology applications is a participant node of the distributed block chain network;

wherein the ledger gateway system comprises protocol converters configured for communicating using two or more protocols.

17. The method of claim 15, wherein the distributed block chain network further comprises a multi-structure data store configured for storing the activity record and processing data associated with the first processing event.

18. The method of claim 15, wherein creating the first block on the block chain ledger associated with the first processing event further comprises:

transforming, via a ledger gateway system, transaction data associated with the first processing event into a predetermined format compatible with the integrated ledger;

logging, via the ledger gateway system, the transaction data associated with the first processing event at a second data location;

transmitting, via the ledger gateway system, the second data location to a transaction processing application associated with the integrated ledger;

adding, via the transaction processing application, the first block comprising the transaction data to the block chain ledger; and validating, via at least one of the plurality of technology applications, the first block.

19. The method of claim 15, wherein the method further comprises:

receiving a request to determine processing event status of a first activity record of the one or more activity records;

determining, a unique identifier for the first activity record;

accessing, via the integrated ledger, a first block chain associated with the unique identifier;

identifying a current block of the first block chain;

determining a current processing event associated with the current block of the first block chain, wherein determining the current processing event comprises determining a current technology application associated with the current block; and initiating a presentation of the current processing event on a display associated with a user system.

20. The method of claim 15, wherein creating a first block on the block chain ledger associated with the first processing event further comprises:

publishing, via the block chain ledger, the first block to the plurality of technology applications, wherein the first block is available to each of the plurality of technology applications, in real-time;

wherein publishing the first block to the plurality of technology applications, in real-time, is configured to trigger, automatically, the second processing event.

* * * * *